United States Patent Office 3,471,465
Patented Oct. 7, 1969

3,471,465
PREPARATION OF CELLULAR POLYURETHANES IN THE PRESENCE OF TRIETHYLENE DIAMINE AND A SILOXANE-OXYALKYLENE BLOCK COPOLYMER
Gunther Loew, Cologne, Germany, assignor, by direct and mesne assignments of one-half to Mobay Chemical Company, Pittsburgh, Pa., a corporation of Delaware, and one-half to Farbenfabriken Bayer Aktiengesellschaft, Leverkusen, Germany, a corporation of Germany
No Drawing. Continuation of abandoned application Ser. No. 758,893, Sept. 4, 1958. This application May 25, 1967, Ser. No. 648,180
Int. Cl. C08g 22/46
U.S. Cl. 260—2.5
10 Claims

ABSTRACT OF THE DISCLOSURE

A one-shot method for the preparation of polyurethane foams from polyethers, organic polyisocyanates, and water wherein the improvement lies in the joint use of triethylene diamine and a specific siloxane-oxylalkylene block copolymer of the formula

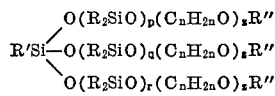

wherein R, R', and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to about 26 to about 34.

---

This application is a continuation of Ser. No. 758,893, filed Sept. 4, 1958, now abandoned.

This invention relates generally to the preparation of polyurethanes and, more particularly, to an improved method for making a cellular polyurethane.

Cellular polyurethanes may be prepared by reacting a polyester of polyalkylene ether glycol and water with an organic polyisocyanate. Water is included in the mixture because it reacts with —NCO groups of an isocyanate to form carbon dioxide. This gas becomes entrapped in the viscous reaction mixture and remains there during solidification to form a cellular structure. Although polyalkylene ether glycols have been suggested for the preparation of cellular polyurethanes, it was the practice commercially, until recently, to make most cellular polyurethanes from polyesters because all of the components used in preparing the cellular product from a polyester can be mixed together at one time. If a polyalkylene ether glycol, and particularly one having secondary hydroxyl groups, is merely substituted into the known polyester processes, a product which is entirely commercially suitable is not obtained. Heretofore, a two-step process was required for making cellular polyurethanes from polyalkylene ether glycols and other components then available. In such a process, the polyalkylene ether glycol is reacted first with an organic polyisocyanate under substantially anhydrous conditions to form an adduct or prepolymer having terminal —NCO groups. This prepolymer is then reacted in a second step with water in the presence of unreacted organic polyisocyanate to form a cellular product.

Although cellular polyurethanes prepared by the two-step technique with polyalkylene ether glycols have many advantages over cellular polyurethanes prepared from polyesters, not entirely suitable commercial process had been available because the use of the two steps increases the cost of the product and increases the amount of material which must be handled. Moreover, it has been necessary to control the preparation of the prepolymer very closely in order that a product which is substantially uniform in composition from one batch to another is available for the second reaction. Furthermore, the polyalkylene ether glycol prepolymers are not completely stable, so storage of the prepolymers frequently introduces a problem in the second step because of change in the chemical composition of the prepolymer during the storage period.

It is, therefore, an object of this invention to provide an improved method for preparing cellular polyurethanes from a polyalkylene ether glycol and an organic polyisocyanate. Another object of the invention is to provide a method for making cellular polyurethanes by a process which involves reacting a polyalkylene ether glycol or other polyol prepared by condensation of an alkylene oxide, an organic polyisocyanate and water together in which these components can be mixed together simultaneously. Still another object of the invention is to provide an improved one-shot method for making cellular polyurethanes.

The foregoing objects and others are accomplished in accordance with this invention, generally speaking, by providing a method for making a cellular polyurethane wherein a polyol prepared by condensation of an alkylene oxide and having a molecular weight of at least about 500, an organic polyisocyanate and water are mixed together substantially simultaneously with a catalytic amount of triethylene diamine and a siloxane-oxyalkylene block copolymer having the formula

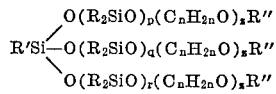

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34. Compounds of this class and a method for making them are disclosed in U.S. Patent 2,834,748. It has been found that the components of a cellular polyurethane in which one of the components is a polyalkylene ether glycol may all be mixed together substantially simultaneously provided the catalyst is triethylene diamine, and a silicone having the above formula is included in the formulation as a stabilizer. The invention thus contemplates a "one shot" method for making cellular polyurethanes from polyalkylene ether glycols and similar polyalkylene compounds which is made possible by the concurrent use of triethylene diamine as a catalyst and a compound of the above formula as a stabilizer.

Any polyalkylene ether glycol having a molecular weight of at least about 500 and prepared by condensation of an alkylene oxide having from 2 to 5 carbon atoms, such as, for example, a polypropylene ether glycol, polyethylene ether glycol, polybutylene ether glycol, a glycol prepared by polymerization of tetrahydrofuran or mixtures thereof, may be used. Likewise, the condensation product of one of the said alkylene oxides with an alcohol having more than two hydroxl groups may be used providing the condensation proruct has a molecular weight of at least about 500. The polyalkylene ether glycols and condensation products of an alkylene oxide and alcohol may be prepared by any known condensation process. The condensation product having more than two hydroxyl groups may be prepared by condensing ethylene oxide, propylene oxide and butylene oxide or other suitable alkylene oxides with a suitable compound having more than two hydroxyl groups, such as, for example, glycerine, trimethylolpropane, hexanetriol-1,2,6, pentaerythritol or the like. If this product is prepared from a triol, it will have three hydroxyl groups while it will have four hydroxyl groups if pentaerythritol of a similar polyhydric compound is used with the alkylene oxide in the condensation process. The polyalkylene ether glycols and other polyhydric condensation products contemplated by the invention are referred to herein frequently for convenience as "polyols." Preferably, the hydroxyl number of these polyols will not exceed about 225.

Any suitable organic polyisocyanate including those disclosed in U.S. Patent 2,764,565 may be used to react with the polyols. 2,4-tolylene, 2,6-tolylene diisocyanate, p,p'-diphenyl methane diisocyanate, 1,5-naphthalene diisocyanate, and other arylene diisocyanates are examples of preferred diisocyanates. Any suitable triisocyanate may also be used, such as, for example, 4,4',4''-triphenylmethane triisocyanate. Suitable emulsifiers may be included in the mixture if desired.

Cellular polyurethanes having good tensile strength after heating for a very short time to a temperature of about 70° C. and having an improved resiliency over that of a polyester cellular polyurethane may be prepared in accordance with this invention. The rigidity of the cellular polyurethane increases with an increase in the amount of triol or other polyfunctional compound in the mixture.

In order better to describe and further clarify the invention, the following are specific embodiments thereof.

EXAMPLE 1

About 100 parts by weight polypropylene ether glycol having an average molecular weight of about 2,000 and an hydroxyl number of about 56, about 35 parts of a mixture of 80 percent 2,4-tolylene diisocyanate and 20 percent 2,6-tolylene diisocyanate, about 4.5 parts of an activator containing about 0.5 part triethylene diamine, about 2.5 parts water and about 1.5 parts of a compound having the formula

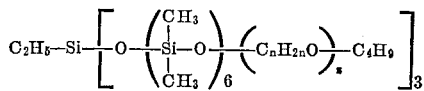

wherein $(C_nH_{2n}O)$ represents about 17 oxyethylene units and about 13 oxypropylene units and the value of $z$ is thus about 30, are mixed together substantially simultaneously with an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2.5 pounds per cubic foot.

EXAMPLE 2

About 100 parts by weight of a triol prepared by condensation of propylene oxide and glycerine and having a molecular weight of about 3,000, about 4.5 parts of an activator mixture containing about 0.5 part triethylene diamine, about 2.5 parts water and about 1.5 parts of a compound having the formula

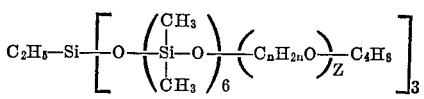

wherein $(C_nH_{2n}O)$ represents about 17 oxyethylene units and about 13 oxypropylene units and the value of $z$ is thus about 30, and about 35 parts of a mixture containing about 80 percent 2,4-tolylene diisocyanate and about 20 percent 2,6-tolylene diisocyanate are all simultaneously mixed together substantially instantaneously. The resulting mixture reacts to form a cellular polyurethane having a density of about 2.5 pounds per cubic foot.

EXAMPLE 3

About 100 parts by weight polypropylene ether glycol having an average molecular weight of about 2,000 and an hydroxyl number of about 56, about 35 parts of a mixture of 80 percent 2,4-tolylene diisocynate and 20 percent 2,6-tolylene diisocyanate, about 4.5 parts of an activator containing about 0.5 part triethylene diamine, about 2.5 parts water and about 1.5 parts of a compound having the formula

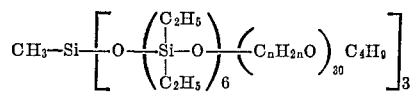

wherein $(C_nH_{2n}O)$ represents about 17 oxyethylene units and about 13 oxypropylene units, are mixed together substantially simultaneously with an apparatus of the type disclosed in U.S. Patent 2,764,565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2.5 pounds per cubic foot.

EXAMPLE 4

About 100 parts by weight polypropylene ether glycol having an average molecular weight of about 2,000 and and hydroxyl number of about 56, about 35 parts of a mixture of 80 percent 2,4-tolylene diisocyanate and 20 percent 2,6-tolylene diisocyanate, about 4.5 parts of an activator containing about 0.5 part triethylene diamine, about 2.5 parts water and about 1.5 parts of a compound having the formula

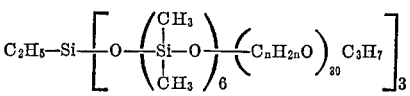

wherein $(C_nH_{2n}O)$ represents about 15 oxyethylene units and about 15 oxypropylene units, are mixed together substantially simultaneously with an apparatus of the type disclosed in U.S. Patent 2,764, 565. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2.5 pounds per cubic foot.

It is to be understood that any other polyol contemplated herein may be substituted in the foregoing examples for the particular polyalkylene ether glycol and triol set forth. Moreover, any other suitable organic polyisocyanate may be substituted for the tolylene diisocyanate used in these examples and any compound represented by the above general formula may be substituted for the particular silicone specified in the examples.

Although all compounds represented by the general formula given hereinbefore are broadly contemplated, best results have been obtained with a compound having the formula

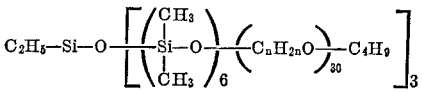

wherein ($C_nH_{2n}O$) is a mixed polyoxyethylene and oxypropylene block containing about 17 oxyethylene units and about 13 oxypropylene units. Hence, it is preferred to use this compound in conjunction with the triethylene diamine catalyst in preparing a cellular polyurethane. It has been found that the combination of catalyst and silicone provided by this invention can be used to best advantage in preparing a cellular polyurethane from a polyalkylene ether glycol having a secondary hydroxyl group, such as, for example, a polypropylene ether glycol.

The amount of triethylene diamine required in the reaction mixture will vary somewhat depending upon the physical characteristics desired in the product and upon the particular polyalkylene ether glycol or other polyol used. Usually, however, from about 0.01 part to about 5 triethylene diamine for 100 parts polyalkylene ether glycol or polyhydric compound having more than two hydroxyl groups will be used. The amount of silicone having one of the formulae set forth hereinbefore required in the mixture will usually vary from about 0.1 part to about 10 parts by weight per 100 parts polyalkylene ether glycol or other polyhydric compound used so this range is preferred.

The cellular product provided by this invention may be used for upholstery, sponges, insulation and the like.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In the preparation of cellular polyurethanes by a process which comprises reacting a polyalkylene ether having at least two hydroxyl groups, water and an organic polyisocyanate, the improvement which comprises effecting the said reaction with a mixture containing triethylene diamine and a siloxane-oxyalkylene block copolymer having the formula

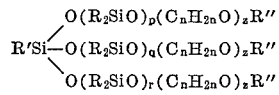

wherein R, R′ and R″ are alkyl radicals having 1 to 4 carbon atoms; $p$, $q$ and $r$ each have a value of from 4 to 8 and ($C_nH_{2n}O$)$_z$ is a mixed polyoxyethylene oxypropylene block containing from 15 to 19 oxyethylene units and from 11 to 15 oxypropylene units with $z$ equal to from about 26 to about 34.

2. The process of claim 1 wherein the polyether has from three to four hydroxyl groups.

3. The process of claim 1 wherein the polyisocyanate is an aromatic polyisocyanate.

4. The process of claim 1 wherein said mixture contains from about 0.01 part to about 5 parts triethylene diamine per 100 parts of said group member.

5. The process of claim 1 wherein said mixture contains from about 0.01 part to about 5 parts triethylene diamine per 100 parts of said group member and from about 0.1 part to about 10 parts of a siloxane-oxyalkylene block copolymer having the formula

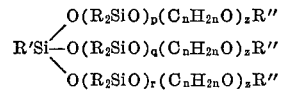

wherein R, R′ and R″ are alkyl radicals having 1 to 4 carbon atoms; $p$, $q$ and $r$ each have a value of from 4 to 8 and ($C_nH_{2n}O$)$_z$ is a mixed polyoxyethylene oxypropylene block containing from 15 to 19 oxyethylene units and from 11 to 15 oxypropylene units with $z$ equal to from about 26 to about 34.

6. A method for making a cellular polyurethane in which all of the reactants are mixed together substantially simultaneously, said method comprising mixing together a compound having a molecular weight of at least about 500 and selected from the group consisting of a polyalkylene ether glycol and a polyhydric compound prepared by condensation of an alkylene oxide having from two to five carbon atoms and an alcohol having from three to four hydroxyl groups, an organic polyisocyanate, water, triethylene diamine and a siloxane-oxyalkylene block copolymer having the formula

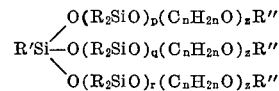

wherein R, R′ and R″ are alkyl radicals having 1 to 4 carbon atoms; $p$, $q$ and $r$ each have a value of from 4 to 8 and ($C_nH_{2n}O$)$_z$ is a mixed polyoxyethylene oxypropylene block containing from 15 to 19 oxyethylene units and from 11 to 15 oxypropylene units with $z$ equal to from about 26 to about 34.

7. The process of claim 1 wherein said organic polyisocyanate is tolylene diisocyanate.

8. The process of claim 1 wherein the siloxane-oxyalkylene block copolymer has the formula

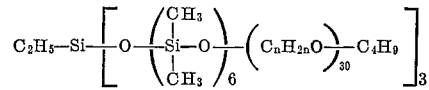

wherein ($C_nH_{2n}O$) is a mixed polyoxyethylene and oxypropylene block containing about 17 oxyethylene units and about 13 oxypropylene units.

9. The process of claim 1 wherein the polyalkylene ether glycol is polypropylene ether glycol and the siloxane-oxyalkylene block copolymer has the formula

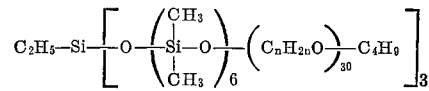

wherein ($C_nH_{2n}O$) is a mixed polyoxyethylene and oxypropylene block containing about 17 oxyethylene units and about 13 oxypropylene units.

10. In the preparation of cellular polyurethanes by a process which comprises reacting a compound having a molecular weight of at least about 500 and selected from the group consisting of a polyalkylene ether glycol and a polyhydric compound prepared by condensation of an alkylene oxide having from 2 to 5 carbon atoms and an alcohol having from 2 to 4 hydroxyl groups, water and an organic polyisocyanate, the improvement which comprises effecting the said reaction while the said reactants are in admixture with from about 0.01 part to about 5 parts triethylene diamine per 100 parts of said group member and from about 0.1 part to about 10 parts of a siloxane-oxyalkylene block copolymer having the formula

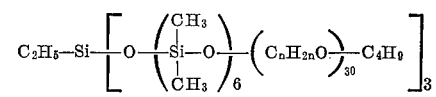

wherein ($C_nH_{2n}O$) is mixed polyoxyethylene and polyoxypropylene block containing about 17 oxyethylene units and about 13 oxypropylene units.

References Cited

UNITED STATES PATENTS

| | | | |
|---|---|---|---|
| 2,425,755 | 8/1947 | Roberts et al. | 260—615 |
| 2,834,748 | 5/1958 | Bailey et al. | 260—825 |
| 2,939,851 | 6/1960 | Orchin | 260—2.5 |
| 2,949,431 | 8/1960 | Britain | 260—2.5 |
| 3,194,773 | 7/1965 | Hostettler | 260—2.5 |
| Re. 24,514 | 8/1958 | Hoppe et al. | 260—2.5 |

DONALD E. CZAJA, Primary Examiner

M. B. FEIN, Assistant Examiner

U.S. Cl. X.R.

260—75, 77.5

Notice of Adverse Decision In Interference

In Interference No. 97,507 involving Patent No. 3,471,465, G. Loew, PREPARATION OF CELLULAR POLYURETHANES IN THE PRESENCE OF TRIETHYLENE DIAMINE AND A SILOXANE-OXYALKYLENE BLOCK COPOLYMER, final judgment adverse to the patentee was rendered Mar. 30, 1972, as to claims 1–10.

[*Official Gazette May 30, 1972.*]